July 1, 1958 B. D. LOUGHLIN 2,841,643

COLOR-SATURATION CONTROL APPARATUS

Filed Oct. 29, 1954 3 Sheets-Sheet 1

COLOR-SATURATION CONTROL APPARATUS

Filed Oct. 29, 1954 3 Sheets-Sheet 3

2,841,643
Patented July 1, 1958

2,841,643

COLOR-SATURATION CONTROL APPARATUS

Bernard D. Loughlin, Lynbrook, N. Y.

Application October 29, 1954, Serial No. 465,554
19 Claims. (Cl. 178—5.4)

The present invention is directed to color-saturation control apparatus for a color-television system and, particularly, to such apparatus for automatically controlling the color saturation of a color image reproduced by a color-television receiver utilizing the NTSC color-television signal now standard in the United States.

In a form of color-television system now standard in the United States and more thoroughly considered in the January 1954 issue of the Proceedings of the I. R. E., information representative of a scene in color being televised is utilized to develop at the transmitter two substantially simultaneous signals, one of which is primarily representative of the luminance and the other of the chrominance of the scene. To develop these signals, the scene being televised is viewed by one or more television cameras to develop color signals individually representative of primary colors, for example, green, red, and blue of the scene and these signals are combined in a manner more fully described in the aforesaid issue of the Proceedings of the I. R. E. to develop a signal which primarily represents all of the luminance or brightness of the televised scene. Additionally, components of the color signals or signals representative thereof and derived therefrom are individually applied to a subcarrier wave signal developed at the transmitter effectively to modulate the latter signal at predetermined phases thereof to develop a modulated wave signal representative of the chrominance of the scene being televised. This modulated wave signal is hereinafter referred to as the chrominance signal. Conventionally, the chrominance signal has a predetermined mean frequency less than the highest video frequency, for example, a frequency of approximately 3.58 megacycles and has amplitude and phase characteristics representative of the color saturation and hue, in other words, of the chromaticity of the color being televised. Finally, at such transmitter, in addition to the conventional line-frequency and field-frequency synchronizing signals, there is developed a color burst signal for effecting synchronization of the color-signal deriving equipment at the receiver with the corresponding modulating equipment at the transmitter. Such color burst signal comprises a few cycles, for example, 8 or 10 cycles of the unmodulated subcarrier wave signal and is superposed on the back porch of each line-frequency synchronizing signal with the peak amplitude of the burst signal being approximately one-half that of the line-frequency signal.

In one type of receiver in such a television system, the chrominance, luminance, and synchronizing signals are derived from an intercepted transmitted signal in the form of a composite video-frequency signal. The luminance signal is translated through one channel. In another channel, the modulation components of the chrominance signal are derived therefrom to combine with the luminance signal in output circuits common to such channels or in the picture tube to develop color signals representative of the primary colors of the televised image. These color signals are then employed as intensity modulation signals in a cathode-ray tube to reproduce the televised image in color.

In order that the reproduced image have proper relative amounts of chrominance and luminance information at the receiver, the intensities of the signals representative of such information should have a predetermined relation to the intensities of the corresponding signals at the transmitter. An indication of any differential gain of the channels through which the luminance and chrominance signals are individually translated, assuming that the gains in these channels should be equal, is available in the ratio of the peak amplitudes of the line-frequency and burst signals at the output circuits of such channels with respect to the ratio of approximately two-to-one for these signals at the transmitter. If, at the output circuits of the luminance and chrominance channels in the receiver, the peak amplitude of a line-frequency pulse translated through the luminance channel is approximately twice the peak amplitude of a color burst signal translated through the chrominance channel, assuming no purposeful difference in the gains of these channels, the over-all gains of these two channels are equal and proper relative intensities of luminance and chrominance information will be applied to the picture tube. The present invention is directed to utilizing the relative peak magnitudes of the burst and line-frequency synchronizing signals in color-saturation control apparatus for automatically controlling the relative gains of the luminance and chrominance channels to effect automatic color-saturation control.

It is, therefore, an object of the present invention to provide new and improved color-saturation control apparatus for a color-television system which does not have the disadvantages and limitations of manual control apparatus.

It is also an object of the present invention to provide in a color-television receiver relatively simply automatic color-saturation control apparatus.

It is a further object of the present invention to provide in a color-television receiver new and improved color-saturation control apparatus which utilizes a minimum of additional circuit elements to effect such control.

It is a still further object of the present invention to provide in a color-television receiver new and improved color-saturation control apparatus which employs some of the conventional circuits in such receiver as part of such apparatus.

In accordance with the present invention, a color-saturation control apparatus for a color-television receiver comprises a circuit for supplying the luminance, chrominance, deflection-synchronizing, and color-synchronizing components of an NTSC color-television signal in which the peak amplitudes of the synchronizing components desirably have a predetermined ratio. The apparatus also comprises a signal-translating network for translating the chrominance and color-synchronizing components as one group and the luminance and deflection-synchronizing components as another group of signals in which the relative amplification of these groups of signals tends to vary. Additionally, the apparatus includes a signal-comparison circuit coupled to the network and responsive to the deflection-synchronizing and color-synchronizing components translated therethrough for comparing the peak amplitudes of the translated synchronizing components to develop a resultant signal representative of any deviation of the peak amplitudes of the supplied synchronizing components from the predetermined ratio. Finally, the apparatus includes means for utilizing the resultant signal to modify the relative amplitudes of the luminance and chrominance components translated through the network, thereby to effect automatic color-saturation control.

For a better understanding of the present invention, together with other and further objects thereof, reference is had to the following description taken in connection with the accompanying drawings, and its scope will be pointed out in the appended claims.

Referring to the drawings:

Fig. 1 is a schematic diagram of a color-television receiver including color-saturation control apparatus in accordance with the present invention;

Fig. 1*a* is a wave form useful in explaining the operation of the control apparatus of Fig. 1;

Figure 1:
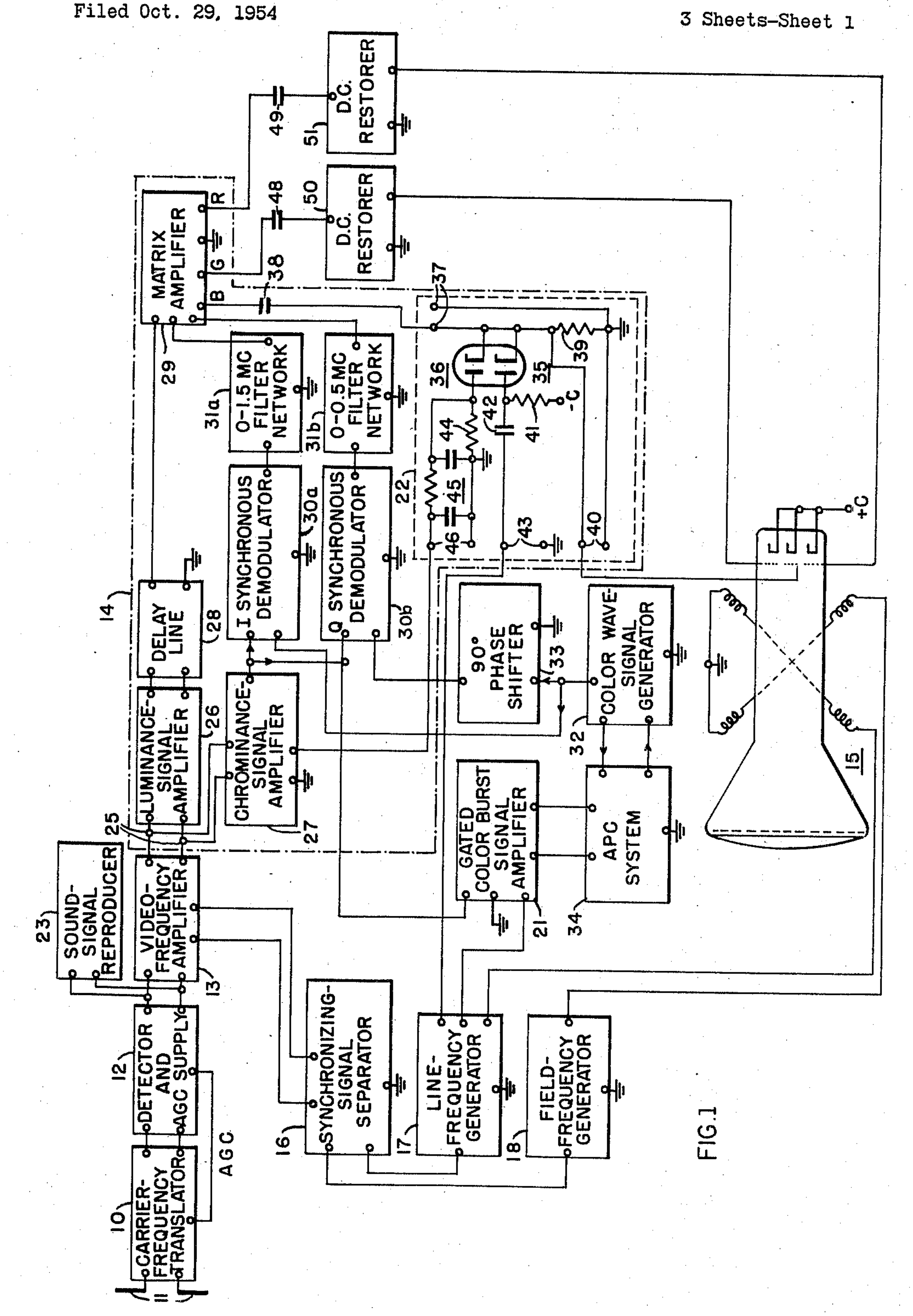

*General description of receiver of Fig. 1*

Referring now to Fig. 1 of the drawings, there is represented a color-television receiver of the superheterodyne type such as may be employed in the color-television system now standard in the United States. The receiver includes a carrier-frequency translator 10 having an input circuit coupled to an antenna system 11. The unit 10 may include, in a conventional manner, one or more stages of wave-signal amplification, an oscillator-modulator, and one or more stages of intermediate-frequency amplification, if such are desired. Coupled to the output circuit of the unit 10 in cascade, in the order named, are a detector and automatic-gain-control (AGC) supply 12, a video-frequency amplifier 13, a luminance-signal amplifier 26, a delay line 28, and a matrix amplifier 29, the latter three units being part of a color-saturation control apparatus 14 in accordance with the present invention and to be considered more fully hereinafter. The amplifier 29 includes three output circuits individually coupled through different ones of three coupling circuits to different control electrode-cathode circuits of an image-reproducing device 15. Each of two of such coupling circuits comprises a coupling condenser and direct-current restorer, specifically the condenser 48 and the restorer 50 and the condenser 49 and the restorer 51. The third coupling circuit comprises a coupling condenser 38 and a signal-comparison circuit 22, the circuit 22 being a unit in the improved color-saturation control apparatus 14 and to be described more fully hereinafter. The amplifier 26 may be a conventional wide band amplifier for translating luminance signals having a maximum band width of approximately 0–4.1 megacycles. However, if some high-frequency detail is considered less important than the detrimental effects of signals at approximately the subcarrier wave-signal frequency of 3.58 megacycles, the unit 26 may be designed to have an upper frequency limit of approximately 3 megacycles. The delay line 28 may be of conventional construction for delaying the translation of signals therethrough to equate the time of travel of such signals to that of signals through a chromaticity channel to be described hereinafter.

The image-reproducing device 15 is conventional and may, for example, comprise a single cathode-ray tube having a plurality of cathodes and a plurality of control electrodes, different pairs of the cathodes and control electrodes being individually responsive to different color signals applied to such circuits by the unit 14 and including an arrangement for directing the beams emitted from the cathodes individually onto different phosphors for developing different primary colors. Such a tube is more fully described in an article entitled "General Description of Receivers for the Dot-Sequential Color Television System Which Employ Direct-View Tri-Color Kenescopes" in the RCA Review for June 1950, at pages 228–232, inclusive. It should be understood that other suitable types of color-television image-reproducing devices may be employed.

The chrominance channel previously referred to herein is also coupled to the output circuit of the video-frequency amplifier 13 through a pair of terminals 25, 25 and is included as a component of the improved color-saturation control apparatus 14. More specifically, such channel includes a chrominance-signal amplifier 27 and a pair of similar color-signal decoding channels, each including a demodulator and a low-pass filter network, coupled to different output circuits of the amplifier 27 and different input circuits of the matrix amplifier 29. One of such color-signal decoding channels includes an I synchronous demodulator **30*a* and a 0–1.5 megacycle filter network 31*a* while the other of such channels includes a Q synchronous demodulator 30*b* and a 0–0.5 megacycle filter network 31*b*. The chrominance-signal amplifier 27, to be considered more fully hereinafter, is a band-pass amplifier having a pass band of approximately 2.5–4.2 megacycles and I and Q demodulators may be conventional synchronous detectors for deriving $E_I'$ and $E_Q'$ color-signal components from quadrature phases of the modulated subcarrier wave signal, for example, such as more fully described in the aforementioned January 1954 issue of the Proceedings of the I. R. E. The matrix amplifier 29** is a conventional amplifier for combining signals applied thereto to develop desired output signals having predetermined proportions of the applied signals. More specifically, such amplifier is designed to combine the luminance signal $E_Y'$ and the $E_I'$ and $E_Q'$ detected signals to develop green, red, and blue color signals $E_G'$, $E_R'$, and $E_B'$. An amplifier of this type is also fully considered in the last-mentioned Proceedings of the I. R. E.

To control the operation of the demodulators **30*a* and 30*b*, the receiver also includes a color wave-signal generator 32 of the sine-wave type for developing a signal synchronized in frequency and phase with the subcarrier wave signal developed at the transmitter. The output circuit of the generator 32 is directly coupled to an input circuit of the I demodulator 30*a* and through a 90° phase shifter 33 to an input circuit of the Q demodulator 30*b*. A frequency and phase-control system is also coupled to the generator 32, specifically including an automatic-phase-control system 34 and a gated color burst signal amplifier 21. The automatic-phase-control system 34** may be of conventional construction or of a type more fully described in the copending application Serial No. 328,917, entitled "Synchronizing System."

An output circuit of the video-frequency amplifier 13 is also coupled through a synchronizing-signal separator 16 to a line-frequency generator 17 and a field-frequency generator 18, output circuits of the latter units being coupled, respectively, to line-deflection and field-deflection windings of the image-reproducing device 15. One output circuit of the line-frequency generator 17 is also coupled to the gated color burst signal amplifier 21 and another output circuit of the unit 17 is coupled through a pair of terminals 43, 43 to the signal-comparison circuit 22 in the color-saturation control apparatus 14. Both of the latter output circuits supply positive pulses derived from the flyback pulse, one centered at the time of occurrence of the line-frequency pulses and the other at the time of occurrence of the color burst signal. Any need for delaying or advancing the time of occurrence of the conventional flyback pulse is conventionally effected by means of differentiating circuits for advancing, and integrating circuits for delaying.

The AGC supply of the unit 12 is connected through the conductor identified as AGC to input terminals of one or more of the stages in the unit 10 to control the gains of such stages for maintaining the signal input to the detector 12 within a relatively narrow range for a wide range of received signal intensities. A sound-signal reproducing unit 23 is also coupled to an output circuit of the detector 12 and may include stages of intermediate-frequency amplification and a sound-reproducing device.

It will be understood that the various units and circuit elements thus far described, with the exception of the signal-comparison circuit 22 and the coupling thereof to amplifiers 27 and 29, may be of conventional construction and design, the details of such units and circuit elements being well known in the art and requiring no further description.

*General operation of receiver of Fig. 1*

Considering briefly the operation of the receiver of Fig. 1 as a whole and assuming that the color-saturation control apparatus 14 comprises conventional luminance and chrominance circuits, a selected composite television signal of the standard type is intercepted by the antenna system 11 and amplified, converted to an intermediate-frequency signal, and further amplified in the unit 10, the video-frequency modulation components thereof being derived in the detector 12 and amplified by the unit 13. The derived video-frequency signal includes a luminance signal $E_Y'$ representative of the brightness of the televised image and defined as follows:

$$E_Y'=0.30E_R'+0.59E_G'+0.11E_B' \quad (1)$$

and a chrominance signal which comprises a subcarrier wave signal having a mean frequency of approximately 3.58 magacycles and which is modulated in quadrature by $E_I'$ and $E_Q'$ components. These $E_I'$ and $E_Q'$ components are definable in terms of components $E_B'$ and $E_R'$ representative, respectively, of the blue and red of the televised image and in terms of the luminance signal $E_Y'$ as follows:

$$E_I'=-0.27(E_B'-E_Y')+0.74(E_R'-E_Y') \quad (2)$$

$$E_Q'=0.41(E_B'-E_Y')+0.48(E_R'-E_Y') \quad (3)$$

where the primes in the above equations indicate that the terms thereof have been gamma-corrected.

A video-frequency signal of the type just described is applied to the luminance-signal amplifier 26 and the chrominance-signal amplifier 27 in the unit 14. The luminance component $E_Y'$ is amplified in the unit 26, delayed in the delay line 28, and applied to an input circuit of the matrix amplifier 29. The delay in the unit 28 is such as to equate the time of travel of the luminance signal and color-difference signals derived from the chrominance signal to the matrix amplifier 29. The chrominance signal comprising a band width of substantially 2.1–4.2 megacycles is amplified in the unit 27 and applied to input circuits of the demodulators 30*a* and 30*b*. As described more fully in articles in the aforesaid January issue of the Proceedings of the I. R. E., the sine-wave signal developed in the generator 32 and applied directly to an input circuit of the demodulator 30*a* and through a 90° phase shifter 33 to an input circuit of the demodulator 30*b* heterodynes in such demodulators with the modulated subcarrier wave signal applied thereto to derive the $E_I'$ and $E_Q'$ modulation components from quadrature phases thereof. To assure derivation at the proper phases of the subcarrier wave signal, the operation of the generator 32 is controlled by the automatic-phase-control system 34 wherein the frequency and phase of the signal developed in the generator 32 and the color burst signal translated through the emplifier 21 are compared to indicate any difference in frequency or phase. If such difference exists, a control signal is developed in the system 34 to control the operation of the generator 32 to minimize or cancel such difference.

The $E_I'$ and $E_Q'$ signals derived in the output circuits of the demodulators 30*a* and 30*b*, respectively, are translated through the filter networks 31*a* and 31*b*, respectively, and individually applied to different input circuits of the matrix amplifier 29. In accordance with the present color-television standards, the $E_I'$ signal is a relatively wide band signal having single and double side-band components and a band width of approximately 0–1.5 megacycles and, therefore, the filter network 31*a* has a 0–1.5 megacycle pass band. The $E_Q'$ signal has a relatively narrow band width having only double side-band components and, thus, the network 31*b* has a pass band of only 0–0.5 megacycle. In the matrix amplifier 29, the $E_I'$, $E_Q'$, and $E_Y'$ signals are combined in proper relative proportions as more fully considered in the aforesaid January 1954 issue of the proceedings of the I. R. E. to develop $E_G'$, $E_R'$, and $E_B'$ color signals representative, respectively, of the green, red, and blue of the televised image. The $E_G'$ signal is translated through the condenser 48, corrected for background level in the direct-current restorer 50, and applied to one control electrode-cathode circuit of the image-reproducing device 15 while the $E_R'$ signal is translated through the condenser 49, has the black level thereof adjusted in the direct-current restorer 51, and is applied to another control electrode-cathode circuit of such device. The $E_B'$ signal is translated through the condenser 38 and the signal-comparison circuit 22, which includes a direct-current restorer and a circuit for developing an automatic-saturation-control signal in a manner to be explained more fully hereinafter, and is applied to the third control electrode-cathode circuit of the image-reproducing device 15.

The line-frequency and field-frequency synchronizing signals are individually separated from the other video-frequency components in the synchronizing-signal separator 16 and are applied, respectively, to the generators 17 and 18 to synchronize the operation of such generators with the operation of related units at the transmitter. These generators supply signals of saw-tooth wave form which are properly synchronized with respect to the transmitted signals and are applied to the line-deflection and field-deflection windings in the image-reproducing device 15 to effect a rectilinear scanning of the image screen in the latter device. There are also developed in the output circuit of the line-frequency generator 17 positive "flyback" pulses resulting from the line retrace of the line-frequency deflection signal and having different times of occurrence. One positive flyback pulse is applied to the unit 21 to gate this amplifier into conduction solely during the latter portion of the line-blanking period so that the automatic-phase-control system for the generator 32 is relatively immune to noise. Another positive pulse is applied through the pair of terminals 43, 43 to the circuit 22 for a purpose to be considered more fully hereinafter.

The color signals applied to the different ones of the control-electrode circuits of the image-reproducing device 15 individually control the intensity of the different beams in the device 15 in accordance with the relative intensities of the different primary colors represented by such signals. This intensity modulation of the cathode beams and the inherent alignment of the electron guns in the device 15 emitting such beams, together with the rectilinear scanning of the beams, result in excitation of different color phosphors on the image screen of such device to cause the televised color image to be reproduced thereon.

The automatic-gain-control or (AGC) signal developed in the unit 12 is effective to control the amplification of one or more of the stages in the unit 10 thereby to maintain the signal input to the detector 12 within a relatively narrow range for a wide range of received signal intensities, the sound-signal modulated wave signal having been selected and amplified in the unit 10 and heterodyned in the detector 12 to develop an intercarrier type of sound signal. The intercarrier sound signal is then further amplified and detected in the reproducer 23 to develop sound-signal modulation components which may then be further amplified and utilized in the unit 23 to reproduce sound in a conventional manner.

*Description of color-saturation control apparatus of Fig. 1*

The color-saturation control apparatus 14 of Fig. 1 includes a circuit for supplying the luminance, chrominance, deflection-synhcronizing, and color-synchronizing components of an NTSC color-television signal in which the peak amplitudes of the synchronizing components desirably have a predetermined ratio, as previously mentioned herein. More specifically, such supply circuit includes the output circuit of the video-frequency amplifier 13 and a pair of terminals 25, 25 for supplying the composite video-frequency signal previously discussed herein.

The control apparatus 14 of Fig. 1 also includes a signal-translating network for translating the chrominance and color-synchronizing components as one group and the luminance and deflection-synchronizing components as another group in which the relative amplification of the groups tends to vary. More specifically, such network comprises the luminance channel including the units 26 and 28 for translating the group of signals including the luminance and deflection-synchronizing components and also includes the chrominance channel including the units 27, 30*a*, 30*b*, 31*a*, and 31*b* for translating the group of signals including chrominance and color-synchronizing components. Such signal-translating network also includes the matrix amplifier 29 common to both such channels.

The color-saturation control apparatus 14 additionally includes a signal-comparison circuit coupled to the aforesaid network and responsive to the deflection-synchronizing and color-synchronizing components translated through the network for comparing the peak amplitudes of the translated synchronizing components to develop a resultant signal representative of any deviation of these peak amplitudes from the aforementioned predetermined ratio. More specifically, such signal-comparison circuit comprises the unit 22 including a pair of peak detectors 35 and 36 each including a diode. The cathodes of the diodes are connected together and through a load resistor 39 to chassis-ground. The output circuit of the matrix amplifier 29 for supplying the signal representative of blue is coupled through the condenser 38 and a pair of input terminals 37, 37 to these cathodes. The resistor 39 is additionally coupled through a pair of terminals 40, 40 to that control electrode-cathode circuit of the image-reproducing device 15 for controlling the intensity of the electron beam for reproducing the blue primary image. The anode circuit of the peak detector 35 includes a load resistor 41 coupled between the anode and a source −C of negative bias potential. As previously mentioned herein, an output circuit of the generator 17, in which a positive "flyback" pulse is developed in coincidence with each line-frequency pulse, is coupled to the pair of input terminals 43, 43 and through a condenser 42 to the anode circuit of the detector 35. The anode circuit of the detector 36 includes a load resistor 44 and is coupled through a low-pass filter network 45 and a pair of output terminals 46, 46 to a gain-control circuit in the chrominance-signal amplifier 27. The network 45 is designed to translate substantially a unidirectional potential having variations in magnitude at a rate substantially less than line frequency.

Finally, the color-saturation control apparatus 14 of Fig. 1 includes means for utilizing the resultant signal to modify the relative amplitudes of the luminance and chrominance components translated through the luminance and chrominance channels of the network thereby to effect automatic color-saturation control. More specifically, such utilizing means includes a gain-control circuit in the amplifier 27 which is coupled through the pair of terminals 46, 46 and the filter network 45 to the output circuit of the peak detector 36.

*Operation of color-saturation control apparatus of Fig. 1*

When the luminance signal $E_Y'$ and the color-difference signals are combined in the matrix amplifier 29 to develop the color signals $E_G'$, $E_R'$, and $E_B'$, it is important that each of the color-difference signals and the luminance signal combined therewith have the proper relative intensities to develop color signals with appropriate proportions of luminance and chrominance. If such relative amplitudes do not exist, the developed color signals will represent either under or oversaturated colors. Therefore, it is important that some reference means be available in the receiver to determine that such luminance and color-difference signals have the appropriate relative intensities.

Figure 1A:
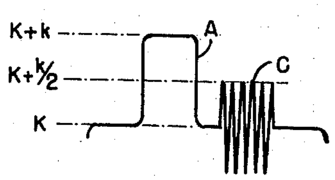

As represented by Fig. 1*a*, the peak amplitudes of the line-synchronizing pulse A and color burst signal C are proportioned at the transmitter to be in the ratio of two-to-one. If such ratio or some desired adjustment thereof is maintained when the luminance and line-synchronizing signals are translated through one channel and the chrominance and color burst signals are translated through another channel, then the chrominance signal and the modulation components derived therefrom will have the proper relative intensity with respect to the luminance signal. In other words, the chrominance signal and the modulation components thereof, under such conditions, accurately represent color saturation. If such ratio of the peak amplitudes of the synchronizing signals represented in Fig. 1*a* changes, except for purposely made changes, then the chrominance signal no longer accurately represents color saturation. The color-saturation apparatus 14 of Fig. 1 compares the peak amplitudes of the line-synchronizing and color burst signals after these signals have been translated, respectively, through the luminance and chrominance channels and maintains the gain of the chrominance channel such that the proper predetermined ratio of these peak amplitudes is obtained. In this manner, accurate representation of color saturation by the chrominance signal is automatically assured.

Considering now the details of operation of the apparatus 14 of Fig. 1, the luminance and the line-synchronizing signals are translated through the amplifier 26, the delay line 28, and at least effectively translated through the amplifier 29 with some gain to develop a luminance component in the output circuit of the unit 29 with the line- and field-synchronizing signal peaks negative. The chrominance signal is translated through the amplifier 27 with some gain. The modulation components of the chrominance signal, that is, the color-difference signals, are derived in the units 30*a* and 30*b* and translated through the networks 31*a* and 31*b* and effectively through the amplifier 29 with some gain. One of these modulation components is a color-difference signal B−Y at a definite phase of the subcarrier wave signal which may, for present purposes, be considered to be zero phase. Though such modulation component is not derived directly, it is derived in terms of specific proportions of the derived I and Q signals and these, when combined in such specific proportion in the amplifier 29, develop a positive derived color-difference signal B−Y therein. Such B−Y signal combines with the luminance signal Y in the unit 29 to develop the blue color signal B.

The color burst signal which, as has previously been mentioned consists of a few cycles of an unmodulated subcarrier wave signal, has a phase of 180° with respect to such zero phase. In other words, the phase of the color burst signal corresponds to that phase of the modulated subcarrier wave signal at which the negative of the blue color-difference signal or −(B−Y) occurs. The detectors 30*a* and 30*b* operate in a conventional manner to heterodyne the color burst and locally generated signals applied thereto to derive signals representative of the in-phase component of the color burst signal in each of the detectors. The low-frequency elements of the derived in-phase components are translated through the filter networks **31*a* and 31*b* to develop pulse-type signals representative of the derived in-phase components. These pulse-type signals combine in that circuit of the amplifier 29 for developing the blue color signal to provide a pulse representative of the color burst signal. Such pulse is negative since the derived blue signal is positve, and the peak amplitude thereof, referred to the peak amplitude of a negative line-frequency pulse translated through the luminance channel, indicates any undesired differential gain in the luminance and chrominance channels. For reasons which will be explained hereinafter, the gain of the chrominance channel is so adjusted, for example, by adjusting the gain of the amplifier 27 with respect to the gain of the luminance channel, that the peak amplitude of the color burst pulse signal in that output circuit of the matrix amplifier 29** for developing the blue signal tends to exceed slightly the level which this signal would have if the luminance and chrominance channels had proper relative gains.

It has been stated that the peak amplitudes of the line-synchronizing and color burst signals are properly in the ratio of two-to-one. This relationship should exist at the input circuits of the amplifiers 26 and 27. However, it is conventional in the receiver to adjust the gain of that channel, through which the color-difference signal representative of blue is at least effectively translated, to be approximately twice that of the luminance channel. The exact gain is 2.03 that of the luminance channel in accordance with present practice based on the present color-television standards. Therefore, the negative peak amplitudes of the line-synchronizing and derived color burst pulses, as developed in that output circuit of the amplifier 29 for developing a signal representative of blue, are properly equal if the desired relative gains in the luminance and chrominance channels are obtained. In other words, if such peak amplitudes are equal, the color signals represent the proper color saturations. The unit 22 is utilized to determine any deviation of the peak amplitudes of such synchronizing signals from equality and to develop a resultant signal representative of any such deviation for application to a gain-control circuit of the chrominance-signal amplifier 27. This resultant signal controls the gain of the chrominance channel with respect to the luminance channel so that such equality of the last-mentioned peak amplitudes is maintained.

In the signal-comparison circuit 22, the peak detector 35 operates as a gated direct-current restorer to establish a black level for the blue signal. This restorer conducts only during the period of occurrence of the line-synchronizing pulses and is controlled by utilizing a positive "flyback" pulse developed in an output circuit of the generator 17, for example, in a winding of the output transformer thereof and applied through the pair of terminals 43, 43 and the condenser 42 to the anode load resistor 41 of the detector 35. During such conduction periods, peak detection of the negative-going line-synchronizing pulse applied to the diode of the detector 35 occurs, developing a direct-current restoring potential across the resistor 39. In a conventional type of ungated direct-current restorer circuit wherein the anode is connected to ground, such detection action would cause the peaks of the line-synchronizing pulses applied to the cathode of the diode to occur at approximately ground potential. In other words, such conduction would be effective to reference the peaks of the line-frequency pulses to ground. With such peaks referenced to ground, since the applied signal has been described as being negative going with the peaks of the synchronizing signals at maximum negative potentials, the picture signals would occur at potentials positive with respect to ground. In a gated type of direct-current restorer circuit, such as the unit 35, by employing a negative bias potential —C of approximately the same magnitude as the gating pulse, the gating causes the potential of the anode of the detector 35 to be substantially ground potential during the gating period and thus the reference potential developed across the resistor 39 is substantially ground. Under such a condition, with the anode of the detector 35 more negative than ground potential except during the aforementioned gating period and the anode of the detector 36 substantially at ground potential, no current flows in the diode of detector 36 unless a signal negative with respect to ground is applied to the cathode thereof. The reference potential is maintained for at least the period of a line as in conventional direct-current restorer circuits by the time-constant characteristics of the circuit.

When the derived color burst signal is applied to the cathode of the detector 36, if the peak negative potential thereof exceeds that of the line-frequency pulse, the cathode of the detector 36 will be driven to a potential negative with respect to the substantially ground reference potential developed across the resistor 39 by the amount that the peak of a derived color burst signal exceeds the peak of a line-frequency pulse. Under such condition, since the anode of the detector 36 is at substantially ground potential, current will flow in the diode 36 causing the potential on the anode thereof to be decreased by an amount related to the difference in magnitudes of the color burst and line-frequency pulses, in other words, by a negative potential representative of the amount by which the peak amplitude of the derived color burst signal applied to the detector 36 exceeds that of the line-frequency pulse applied to the same circuit. This negative potential is effective to adjust the gain of the chrominance amplifier 27 and thereby to tend to maintain the peak amplitudes of the derived color burst signal and the line-synchronizing pulses as applied to the cathodes of the two peak detectors substantially equal. Also as previously explained, in order to assure that some correction potential is developed, the gain of the chrominance channel is purposely adjusted initially to be slightly higher than it properly should be with respect to that of the luminance channel so that each derived color burst signal is normally of slightly greater magnitude than each line-frequency pulse as applied to the cathodes of the two peak detectors.

Figure 2:
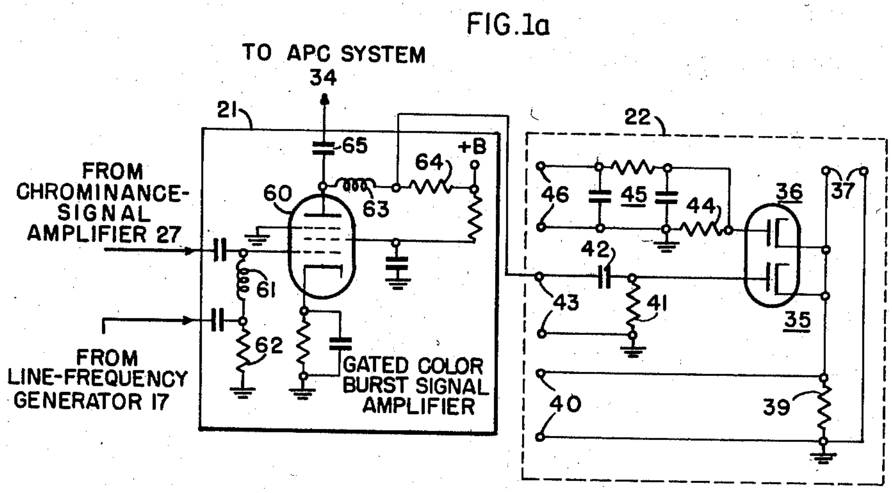
Fig. 2 is a circuit diagram of a modified form of a portion of the color-saturation control apparatus of Fig. 1.

*Description and explanation of operation of modified portion of color-saturation control apparatus as represented by Fig. 2*

In the signal-comparison circuit 22 included in the control apparatus 14 of Fig. 1, the peak detector 35 is rendered conductive during the time of occurrence of the horizontal synchronizing pulse and is nonconductive at all other times. As in conventional direct-current restorers, the circuit time constant is sufficiently long that the restoration level established by any one pulse is maintained at least for about one line of scanning. This manner of operation (conduction only during pulses) is employed to prevent this detector from being conductive during the time of occurrence of the color burst signal since conduction at such time would diminish the accuracy with which the peaks of the two synchronizing signals are compared. However, such manner of operation utilizes a negative bias potential on the anode of the detector 35. Instead of utilizing such a negative bias potential and maintaining the diode of the detector 35 normally nonconductive, it may be desirable to have such diode conductive except during the time of occurrence of the color burst signal. Combination of the gated burst amplifier 21 and the comparison circuit 22 in the manner represented in Fig. 2 accomplishes such results.

In Fig. 2, some of the details of a gated color burst signal amplifier, such as the unit 21 of Fig. 1, are represented. Such amplifier includes a multielectrode tube 60 having the cathode thereof connected through a biasing circuit to chassis-ground and the first control electrode coupled to a load circuit including an inductor 61 and a resistor 62 in series and to units such as the chrominance-signal amplifier 27 and the line-frequency generator 17 of Fig. 1. The anode of the tube 60 is coupled to a source of +B potential through a load circuit including, in series, an inductor 63 and a resistor 64 and is coupled through a condenser 65 to a unit such as the APC system 34 of Fig. 1. The inductors 61 and 63 are used primarily to isolate the subcarrier wave signal from the input circuit coupled to the generator 17 and the output circuit coupled to the apparatus 22. The junction of the inductor 63 and the resistor 64 is connected through the pair of terminals 43, 43 in the signal-comparison circuit 22 to the anode circuit of the peak detector 35 in which the anode load resistor 41 is connected to ground.

The circuits of Fig. 2 operate in a manner somewhat similar to that of the corresponding circuits of Fig. 1. More specifically, the amplifier 21 is gated into a conductive state by a positive-going pulse applied thereto from the output circuit of the line-frequency generator 17. This gating occurs at the time of occurrence of the color burst signal applied to the first control electrode of the tube 60 from the output circuit of the chrominance-signal amplifier 27 and causes a negative-going pulse to be developed in the anode circuit of the tube 60 at the junction of the inductor 63 and the resistor 64. This negative-going pulse is applied to the anode circuit of the peak detector 35 rendering this detector non-conductive during the duration of such negative pulse, in other words, during the duration of the color burst signal.

The peaks of the line-frequency pulses applied to the cathode of the peak detector 35 are referenced to ground potential. Thus, neglecting for the moment any consideration of the effect of derived color burst signals, the cathodes of peak detectors 35 and 36 have applied thereto potentials which vary from a minimum of ground for the peaks of the line-frequency pulses to some maximum potential for signals representing maximum picture brightness. Considering now the effect of derived color burst signals as explained previously, the gain of the chrominance amplifier is initially adjusted to cause such burst signals to have peak amplitudes slightly more negative than that of line-frequency pulses as applied to the cathodes of the detectors 35 and 36. Consequently, since the detector 35 is gated off at the time of application of the color burst signal to such cathodes, only the detector 36 is capable of conduction at this time and this detector conducts to develop a negative potential in the anode circuit thereof which has a magnitude substantially equal to that by which the peak magnitude of the derived color burst signal exceeds the peak magnitude of the line-frequency pulses applied to the cathodes of the detectors 35 and 36. This negative potential developed in the anode of the detector 36 is averaged by the filter network 45 and utilized as a bias potential to control the gain of a unit such as the chrominance-signal amplifier 27 of Fig. 1. Since the developed potential is negative, the gain of such amplifier is reduced so as to tend to diminish the difference in the peak amplitudes of the color burst and line-frequency signals as applied to the cathodes of the diodes 35 and 36.

Figure 3:
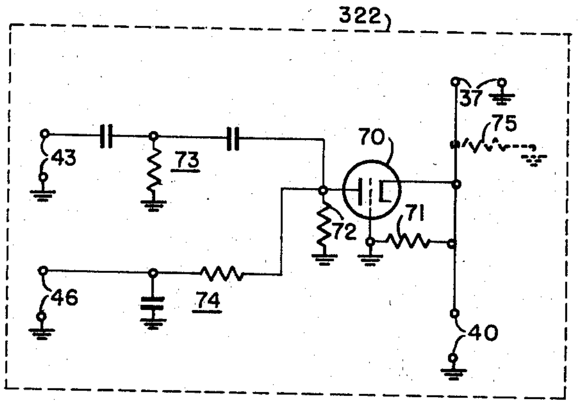
Fig. 3 is a circuit diagram of another modified form of a portion of the control apparatus of Fig. 1.

*Description and explanation of operation of signal-comparison circuit of Fig. 3*

In the signal-comparison circuits 22 of Figs. 1 and 2, a pair of diodes are employed in two peak detector circuits to effect the development of the color-saturation control signal. For economy and other purposes, it may be desirable to develop such control signal in a circuit employing only one tube to compare the peak magnitudes of the two synchronizing signals. The circuit of Fig. 3 effects the latter result.

The signal-comparison circuit 322 of Fig. 3 includes a triode 70 having the control electrode thereof grounded and a load resistor 71 coupled between such control electrode and the cathode of the triode. The cathode of the triode is also connected through the pair of terminals 37, 37 and the pair of terminals 40, 40, respectively, to that output circuit of a unit, such as the matrix amplifier 29 of Fig. 1, for translating the signal representative of blue and to that control-electrode circuit of an image-reproducing device, such as the unit 15 of Fig. 1, for controlling the development of the blue image. The anode circuit of the triode 70 includes a load resistor 72 and is coupled through a differentiating circuit 73 and the pair of terminal 43, 43 to the output circuit of a unit such as the line-frequency generator 17 of Fig. 1. The anode circuit of the triode 70 is also coupled through a filter network 74 and the pair of terminals 46, 46 to a gain-control circuit of an amplifier such as the chrominance-signal amplifier 27 of Fig. 1. The filter network 74 has a time constant long with respect to line frequency so that the control signal developed at the output terminals 46, 46 is a slowly undulating unidirectional signal.

In the signal-comparison circuit 322 of Fig. 3, the circuit including the triode 70 performs functions equivalent to those performed by the pair of diodes in the peak detectors 35, 36 of the corresponding comparison circuit of Fig. 1. In operation, the anode of the triode 70 is normally more negative than the ground potential on the control electrode thereof due to the polarity of the control signal developed in the anode circuit. Consequently, until the anode is gated by a positive pulse, no anode current flows. The cathode and control electrode of the triode 70 act as a diode peak detector to reference to ground the peaks of the negative-going line-frequency pulses applied to the cathode. The signal representative of blue in the color image, with the unidirectional component thereof restored by such referencing of the synchronizing-signal peaks to ground, is applied through the terminals 40, 40 to a control-electrode circuit of an image-reproducing device to effect proper reproduction of the blue image therein.

During the occurrence of the derived and negative-going color burst signal applied through the terminals 37, 37 to the cathode of the triode 70, the anode thereof is raised to a positive potential by a positive pulse applied thereto from the differentiating circuit 73. This positive pulse is developed in the circuit 73 by differentiating a negative-going flyback pulse applied through the terminals 43, 43 to the differentiating circuit 73 to develop at the anode of the tube 70 a negative pulse corresponding to the leading edge and a positive pulse corresponding to the trailing edge of the flyback pulse. The magnitude of the current which then flows through the anode circuit of the tube 70 and develops a potential across the resistor 72 is determined by the relationship of the peak magnitude of the color burst signal applied through the terminals 37, 37 to the substantially ground reference potential developed on the cathode by the line-frequency signals. As explained with reference to the signal-comparison circuits of Figs. 1 and 2, the peak magnitude of the color burst signal is initially purposely made slightly more negative than that of the line-frequency pulses in order that some anode current will flow during the occurrence of the color burst signal and some negative potential will be developed across the resistor 72. This potential will tend to reduce the magnitude of the color burst signal by tending to reduce the gain in the chrominance channel.

In the operation of the triode 70, the values of the resistors 71 and 72 with respect to each other and with respect to the blue signal input circuit impedance 75, represented as a broken line resistor, are important in obtaining the desired control action. These impedances should have descending magntudes in the order $72>71>>75$. If the resistor 71 is too low in value, being approximately the magnitude of the input impedance 75, there will tend to be a crushing action of the line-frequency synchronizing pulses, that is, effectively the action of the direct-current restoration will then be such as to cut off some of each of the line-frequency synchronizing pulses. This results in referencing to ground some lower point than the line-synchronizing signal peaks. In such case, the difference in the magnitudes of the color burst and line-synchronizing signals would not be accurately determined, if these signals should be of equal magnitude. The magnitude of the anode resistor 72 should be as many times that of the resistor 71 as is practicable so that there will be only a small amount of anode current flowing during the time of occurrence of the color burst signal so as not to disturb appreciably the reference potential on the resistor 71.

Figures 4, 4A:
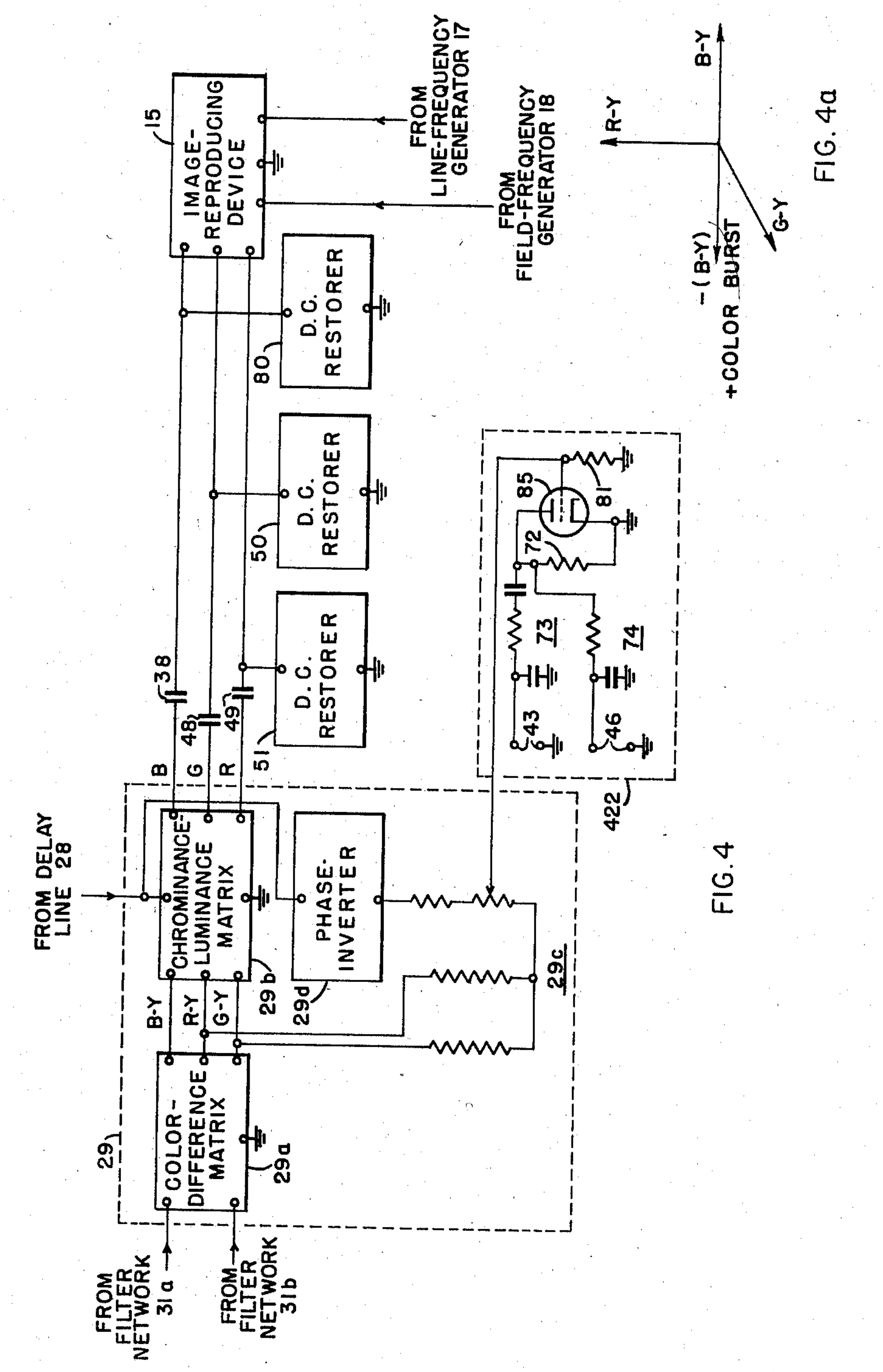
Fig. 4 is a circuit diagram of a modified form of a portion of the color-saturation control apparatus of Fig. 1.
Fig. 4*a* is a vector diagram useful in explaining the operation of the portion of the color-saturation control apparatus of Fig. 4.

*Description and explanation of operation of portion of color-saturation control apparatus represented by Fig. 4*

In the color-saturation control apparatus of Figs. 1, 2, and 3, the color saturation is not purposely controlled to be over or undersaturated to effect some pleasing picture. This may be an undesired limitation. The color-saturation control apparatus including the components represented in Fig. 4 permits the greater flexibility of purposely adjusting for over or undersaturation while retaining the automatic-saturation-control feature.

In Fig. 4, a matrix amplifier, such as the unit 29 of Fig. 1, is represented in greater detail to include a color-difference matrix 29*a*, a chrominance-luminance matrix 29*b*, and a resistor matrix 29*c* cross-coupling the channel for translating the luminance signal Y and the channels for translating the color-difference signals R—Y and G—Y. A phase inverter 29*d* is coupled between the input circuit connected to the delay line 28 in the luminance channel and the resistor matrix 29*c* to apply a negative luminance signal —Y to the latter matrix. The output circuits of the chrominance-luminance matrix 29*b* for developing the color signals B, R, and G are individually coupled to different input circuits of the image-reproducing device 15 and each of such output circuits includes a direct-current restorer.

The signal-comparison circuit 422 of Fig. 4 is similar to the unit 322 of Fig. 3, differing therefrom in the cathode and grid circuits of the triode 85 in the unit 422 as compared to the corresponding circuits of the triode 70 in the unit 322. The grid circuit of the triode 85 includes a biasing resistor 81 and is coupled to a voltage divider in the resistor matrix 29*c*. The cathode of the triode 85 is connected to ground.

Dismissing for the moment the nature of the line-frequency pulses and derived color burst signal applied from the matrix amplifier 29 to the grid circuit of the triode 85, the cathode and grid circuits of the triode 85 operate in a manner similar to the corresponding circuits of the triode 70 of unit 322 of Fig. 3 to effect peak detection of line-frequency pulses applied thereto from the matrix 29. However, as will be explained more fully hereinafter, both the derived color burst signal and the line-frequency pulses applied to the grid circuit of the tube 85 are positive instead of negative as in the signal-comparison circuit of Fig. 3. Each line-frequency pulse develops a bias or reference potential at the grid of the tube 85, such reference potential determining the magnitude of the anode current that will flow during the time a positive derived color burst signal is applied to the grid of the tube 85 in coincidence with the gating of the anode to a conductive state by a positive pulse applied thereto through the circuit 73. Such current determines the magnitude of the control potential developed in the anode circuit and applied to the chrominance channel through the pair of terminals 46, 46. By developing the reference potential in the grid circuit instead of in the cathode circuit, as in the unit 322 of Fig. 3, the effect of anode current on such reference potential is diminished, thereby making such reference potential more stable.

In the matrix 29*c*, the resistors which are coupled to the R—Y and G—Y channels combine those derived components of the color burst signal developed in these channels into a positive derived color burst signal. The relationships of the signals R—Y, B—Y, G—Y, and —(B—Y) or color burst signal, as represented by the vectors of Fig. 4*a*, indicate that components of the color burst signal derived in the R—Y and G—Y channels may be combined to develop a positive derived color burst signal the inverse of that which would be derived as a negative such signal in the B—Y channel. In other words, any combination of components of the color burst signal derived in the R—Y and G—Y channels results in a positive derived color burst signal, whereas a color burst signal derived in the B—Y channel, as described with reference to the color-saturation control apparatus of Fig. 1, is a negative derived color burst signal. In developing such positive derived color burst signal, components from both the R—Y and G—Y channels need not be required. Since the phase of the subcarrier wave signal at which the R—Y modulation component occurs is in quadrature with the phase of the color burst signal, as indicated by the vector diagram of Fig. 4*a*, theoretically no component of the color burst signal should be derived in the R—Y channel and only the positive component in the G—Y channel should be available. However, in practice, the phase of the locally generated signal employed to derive both the R—Y and G—Y components or their equivalents tends to vary slightly with respect to the color burst signal even though controlled by means of an automatic-phase-control circuit by such color burst signal. Because of the large phase angle between the color burst signal and that phase of the subcarrier wave signal at which the G—Y modulation component occurs, the component of the color burst signal derived in the G—Y channel tends to vary greatly in magnitude with any slight deviation of derivation of the G—Y signal from the proper phase of the subcarrier wave signal. Such deviation of derivation will occur as the phase of the locally generated signals varies and, in the R—Y channel, causes derivation of an R—Y component at other than a phase of the subcarrier wave signal in quadrature with the color burst signal. Such phase variation causes a small component of the color burst signal to be derived in the R—Y channel and such component combines with the component of the color burst signal derived at the same time in the G—Y channel to stabilize the magnitude of the resultant derived color burst signal.

The magnitude of the resultant positive derived color burst signal developed in the matrix 29*c* is not equal to that of the corresponding signal derived in the B—Y channel because the gains of the R—Y and G—Y channels differ from that of the B—Y channel. Consequently, there initially is no status of equality in the peak magnitudes of the resultant derived color burst signal and the line-frequency pulse translated through the luminance or Y channel. However, such inequality can be compensated for by appropriate adjustment of the setting of the voltage divider in the matrix 29*c* to attenuate the line-frequency pulse sufficiently with respect to the resultant derived color burst signal to effect equality in the peak amplitudes of these signals at the tap of the voltage divider for proper saturation.

Since a negative luminance signal —Y is developed in the output circuit of the phase inverter 29*d*, positive-going line-frequency pulses are developed in the output circuit of such unit. Consequently, positive-going line-frequency pulses are applied to one terminal of the voltage divider in the matrix 29*c* while positive-going derived color burst signals are applied to the other terminal thereof. The voltage divider in the matrix 29*c* permits manual control of the degree of saturation desired while the comparison circuit 422 automatically maintains such desired saturation. The manner in which this is effected may be more clearly understood by considering the effects obtained with the variable tap of the voltage divider at different settings.

If the variable tap of the voltage divider is set in the manner considered above to obtain equal peak magnitudes thereat for the derived color burst signal and line-frequency pulses applied thereto, then these two signals should have equal magnitudes at the grid of the tube 85 and should operate in the manner previously described herein to effect automatic saturation control. If the variable tap is considered as moved toward the top of the voltage divider, that is, to a position where the resistance in the circuit for the line-frequency pulse decreases, then the magnitude of the line-frequency pulse at such tap portion will tend to be greater than that for the color burst signal. However, the signal-comparison circuit 422 operates to control the relative gains of the chrominance and luminance channels to cause the magnitudes of the derived color burst signal and the line-frequency pulse at such tap position to be equal. Consequently, the gain of the chrominance channel will automatically be increased by the control signal developed in the unit 422 to cause the magnitudes of the derived color burst signal and line-frequency pulse at such tap position to be equal. This results in over-saturation of the colors since by adjustment of the voltage divider the chrominance channel has been controlled to have a greater gain than it should with respect to the luminance channel. If undersaturation of the color is desired with automatic saturation control, the tap of the voltage divider would be moved to a position near the lower terminal thereof so as to tend to cause the derived color burst signal to have a greater magnitude than the line-frequency pulse at such tap position. It is apparent, therefore, that a color-saturation control apparatus in accordance with the present invention including circuits such as represented in Fig. 4 has the flexibility of permitting any degree of saturation desired with automatic control of the selected saturation.

In considering the circuits of Fig. 4, it should be understood that a matrixing system cross-coupling the R—Y and G—Y channels is employed therein solely for the purpose of developing a positive derived color burst signal. If, as in Figs. 1, 2 and 3, negative line-frequency pulses and negative derived color burst signals are employed, the flexibility of manual control of the degree of saturation may still be obtained in accordance with the teaching of the circuit of Fig. 4. If such negative signals are employed, then the voltage divider is simply coupled between the luminance channel to provide a negative line-frequency pulse and the B—Y channel to provide a negative derived color burst signal. The manner of operation of the voltage divider to effect manual control of the degree of saturation will then be the same as that described with reference to Fig. 4.

There have been described herein various embodiments of an automatic color-saturation control apparatus wherein the relative magnitudes of deflection-synchronizing and color-synchronizing signals are employed to develop a control potential to effect such automatic color-saturation control. It should be understood that, though specific circuits have been described, the invention is not limited to such circuits and many circuits similar to those described herein employing a mode of operation to effect comparison of the peak magnitudes of the two synchronizing signals above mentioned may be employed in accordance with the teaching of the invention.

While there have been described what are at present considered to be the preferred embodiments of this invention, it will be obvious to those skilled in the art that various changes and modifications may be made therein without departing from the invention, and it is, therefore, aimed to cover all such changes and modification as fall within the true spirit and scope of the invention.

What is claimed is:

1. In color-television apparatus, a color-saturation control apparatus comprising: a circuit for supplying the luminance, chrominance, deflection-synchronizing, and color-synchronizing components of a color-television signal; a signal-translating network for translating said chrominance and said luminance components in which the relative amplification of said translated components can be varied; a signal-comparison circuit responsive to said deflection-synchronizing and color-synchronizing components for comparing the amplitudes of said synchronizing components to develop a resultant signal representative of any deviation of said amplitudes of said synchronizing components from a predetermined ratio; and means for utilizing said resultant signal to modify the relative amplitudes of said luminance and chrominance components translated through said network, thereby to effect automatic color-saturation control.

2. In color-television apparatus, a color-saturation control apparatus comprising: a circuit for supplying the luminance, chrominance, deflection-synchronizing, and color-synchronizing components of a color-television signal in which the peak amplitudes of said synchronizing components desirably have a predetermined ratio; a signal-translating network for translating said chrominance and color-synchronizing components as one group and said luminance and deflection-synchronizing components as another group of signals in which the relative amplification of said groups of signals can be varied; a signal-comparison circuit coupled to said network and responsive to said deflection-synchronizing and color-synchronizing components translated therethrough for comparing the peak amplitudes of said translated synchronizing components to develop a resultant signal representative of any deviation of said peak amplitudes of said translated synchronizing components from said predetermined ratio; and means for utilizing said resultant signal to modify the relative amplitudes of said luminance and chrominance components translated through said network and the relative amplitudes of said deflection-synchronizing and color-synchronizing components to maintain said predetermined ratio, thereby to effect automatic color-saturation control.

3. In a color-television receiver, a color-saturation control apparatus comprising: a circuit for supplying the luminance, chrominance, line-synchronizing, and color-synchronizing components of an NTSC color-television signal in which the peak amplitudes of said synchronizing components desirably have a ratio of two-to-one; a signal-translating network for translating said chrominance and color-synchronizing components as one group and said luminance and line-synchronizing components as another group of signals in which the relative amplification of said groups of signals can be varied; a signal-comparison circuit coupled to said network and responsive to said line-synchronizing and color-synchronizing components translated therethrough for comparing the peak amplitudes of said translated synchronizing components to develop a resultant signal representative of any deviation of said peak amplitudes of said translated synchronizing components from said ratio; and means for utilizing said resultant signal to modify the relative amplitudes of said luminance and chrominance components translated through said network, and the relative amplitudes of said deflection-synchronizing and color-synchronizing components to maintain said ratio of two-to-one, thereby to effect automatic color-saturation control.

4. In a color-television receiver, a color-saturation control apparatus comprising: a circuit for supplying the luminance, chrominance, line-synchronizing, and color-synchronizing components of an NTSC color-television signal in which the peak amplitude of said color-synchronizing component desirably is one-half that of the line-synchronizing component; a signal-translating network for translating said chrominance and color-synchronizing components as one group and said luminance and line-synchronizing components as another group of signals in which the relative amplification of said groups of signals can be varied; a signal-comparison circuit coupled to said network and responsive to said line-synchronizing components to establish a reference potential and responsive to said color-synchronizing component for comparing the peak amplitude thereof to said reference potential to develop a resultant signal representative of any deviation of said peak amplitude of said translated color-synchronizing component from one-half that of said translated line-synchronizing component; and means for utilizing said resultant signal to modify the relative amplitudes of said luminance and chrominance components translated through said network and the relative amplitudes of said deflection-synchronizing and color-synchronizing components to maintain the peak amplitude of said translated color-synchronizing component one-half that of said translated line-synchronizing component, thereby to effect automatic color-saturation control.

5. In a color-television receiver, a color-saturation control apparatus comprising: a circuit for supplying the luminance, chrominance, deflection-synchronizing, and color-synchronizing components of an NTSC color-television signal in which the peak amplitudes of said synchronizing components desirably have a predetermined ratio; a signal-translating network including a luminance channel for translating said luminance and deflection-synchronizing components with one gain and a chrominance channel for translating said chrominance and color-synchronizing components with a gain which desirably is a constant fraction of said one gain, the relative gains of said channels tending to vary; a signal-comparison circuit coupled to said network and responsive to said deflection-synchronizing and color-synchronizing components translated therethrough for comparing the peak amplitudes of said translated synchronizing components to develop a resultant signal representative of any deviation of said peak amplitudes of said translated synchronizing components from said predetermined ratio; and means for applying said resultant signal to one of said luminance and chrominance channels to modify the relative amplitudes of said luminance and chrominance components translated through said channels, thereby to effect automatic color-saturation control.

6. In a color-television receiver, a color-saturation control apparatus comprising: a circuit for supplying the luminance, chrominance, deflection-synchronizing, and color-synchronizing components of an NTSC color-television signal in which the peak amplitudes of said synchronizing components desirably have a predetermined ratio; a signal-translating network including a luminance channel for translating said luminance and deflection-synchronizing components with one gain and a chrominance channel for translating said chrominance and color-synchronizing components with a gain which desirably is a constant fraction of said one gain, the relative gains of said channels tending to vary; a signal-comparison circuit coupled to said network and responsive to said deflection-synchronizing and color-synchronizing components translated therethrough for comparing the peak amplitudes of said translated synchronizing components to develop a resultant signal representative of any deviation of said peak amplitudes of said translated synchronizing components from said predetermined ratio; and means for applying said resultant signal to said chrominance channel to control the gain thereof so as to modify the relative amplitudes of said luminance and chrominance components translated through said network, thereby to effect automatic color-saturation control.

7. In a color-television receiver, a color-saturation control apparatus comprising: a circuit for supplying the luminance, chrominance, deflection-synchronizing, and color-synchronizing components of an NTSC color-television signal in which the peak amplitudes of said synchronizing components desirably have a predetermined ratio and said chrominance component is modulated by signals individually representative of different colors; a luminance channel for translating said luminance and deflection-synchronizing components; a chrominance channel for translating said chrominance and color-synchronizing components including means for deriving a signal representative of one color and a pulse signal representative of said color-synchronizing component with the peak amplitude of said pulse signal desirably substantially equal to that of said translated deflection-synchronizing component; a signal-comparison circuit coupled to said channels and responsive to said translated deflection-synchronizing component and said derived pulse signal for comparing the peak amplitudes of said translated synchronizing component and said pulse signal to develop a resultant signal representative of any deviation of said peak amplitudes of said translated synchronizing components from said predetermined ratio; and means for applying said resultant signal to said chrominance channel to modify the relative amplitudes of said luminance and chrominance components translated through said luminance and chrominance channels, thereby to effect automatic color-saturation control.

8. In color-television apparatus, a color-saturation control apparatus comprising: a circuit for supplying the luminance, chrominance, deflection-synchronizing, and color-synchronizing components of a color-television signal in which the peak amplitudes of said synchronizing components desirably have a predetermined ratio; a signal-translating network for translating said chrominance and color-synchronizing components and said luminance and deflection-synchronizing components in which the relative amplification of said groups of signals can be varied; a signal-comparison circuit including electron-discharge apparatus coupled to said network and having an input circuit responsive to said deflection-synchronizing component translated through said network to develop a reference potential representative of the peak amplitude of said translated deflection-synchronizing component and responsive to said color-synchronizing component translated through said network for comparing the peak amplitudes of said translated color-synchronizing component and said reference potential to develop a resultant signal representative of any deviation of said peak amplitudes of said translated synchronizing components from said predetermined ratio; and means for utilizing said resultant signal to modify the relative amplitudes of said luminance and chrominance components translated through said network, thereby to effect automatic color-saturation control.

9. In a color-television receiver, a color-saturation control apparatus comprising: a circuit for supplying the luminance, chrominance, deflection-synchronizing, and color-synchronizing components of a color-television signal in which the peak amplitudes of said synchronizing components desirably have a predetermined ratio; a signal-translating network for translating said chrominance and color-synchronizing components and said luminance and deflection-synchronizing components in which the relative amplification of said groups of signals can be varied; a signal-comparison circuit including a pair of peak detectors coupled to said network, one of said detectors being responsive to said deflection-synchronizing component translated through said network to develop a reference potential representative of the peak amplitude of said translated deflection-synchronizing component and another of said peak detectors being responsive to said color-synchronizing component translated through said network and to said reference potential for developing a resultant signal representative of any deviation of said peak amplitudes of said translated synchronizing components from said predetermined ratio; and means for utilizing said resultant signal to modify the relative amplitudes of said luminance and chrominance components translated through said network, thereby to effect automatic color-saturation control.

10. In a color-television receiver, a color-saturation control apparatus comprising: a circuit for supplying the luminance, chrominance, deflection-synchronizing, and color-synchronizing components of an NTSC color-television signal in which the peak amplitudes of said synchronizing components desirably have a predetermined ratio; a signal-translating network for translating said chrominance and color-synchronizing components as one group and said luminance and deflection-synchronizing components as another group of signals in which the relative amplification of said groups of signals can be varied; a signal-comparison circuit including a pair of diodes having a common input circuit coupled to said network and responsive to said deflection-synchronizing and color-synchronizing components translated therethrough for developing a reference potential in said input circuit in response to said translated deflection-synchronizing component and for utilizing said reference potential and said translated color-synchronizing component to develop a resultant signal representative of any deviation of said peak amplitudes of said translated synchronizing components from said predetermined ratio; and means for utilizing said resultant signal to modify the relative amplitudes of said luminance and chrominance components translated through said network, thereby to effect automatic color-saturation control.

11. In a color-television receiver, a color-saturation control apparatus comprising: a circuit for supplying the luminance, chrominance, deflection-synchronizing, and color-synchronizing components of an NTSC color-television signal in which the peak amplitudes of said synchronizing components desirably have a predetermined ratio; a signal-translating network for translating said chrominance and color-synchronizing components as one group and said luminance and deflection-synchronizing components as another group of signals in which the relative amplification of said groups of signals can be varied; a signal-comparison circuit coupled to said network and responsive to said deflection-synchronizing and color-synchronizing components translated therethrough for comparing the peak amplitudes of said translated synchronizing components to develop a resultant signal representative of any deviation of said peak amplitudes from said predetermined ratio; and means for applying said resultant signal to said network to modify the relative amplitudes of said luminance and chrominance components translated therethrough, thereby to effect automatic color-saturation control.

12. In a color-television receiver, a color-saturation control apparatus comprising: a circuit for supplying the luminance, chrominance, deflection-synchronizing, and color-synchronizing components of an NTSC color-television signal in which the peak amplitudes of said synchronizing components desirably have a predetermined ratio; a signal-translating network for translating said chrominance and color-synchronizing components as one group and said luminance and deflection-synchronizing components as another group of signals in which the relative amplification of said groups of signals can be varied; a first detector circuit coupled to said network and responsive to said deflection-synchronizing component translated therethrough to clamp the peak of said translated deflection-synchronizing component to a reference potential; another detector circuit coupled to said network and to said first detector circuit and jointly responsive to said reference potential and said color-synchronizing component translated through said network for developing a resultant signal representative of any deviation of said peak amplitudes of said translated synchronizing components from said predetermined ratio; and means for utilizing said resultant signal to modify the relative amplitudes of said luminance and chrominance components translated through said network, thereby to effect automatic color-saturation control.

13. In a color-television receiver, a color-saturation control apparatus comprising: a circuit for supplying the luminance, chrominance, deflection-synchronizing, and color-synchronizing components of an NTSC color-television signal in which the peak amplitudes of said synchronizing components desirably have a predetermined ratio; a signal-translating network for translating said chrominance and color-synchronizing components as one group and said luminance and deflection-synchronizing components as another group of signals in which the relative amplification of said groups of signals can be varied; a first diode circuit having the cathode thereof coupled to said network and responsive to said deflection-synchronizing component translated therethrough to clamp the peak of said translated deflection-synchronizing component to a reference potential; another diode circuit having the cathode thereof coupled to said network and to said cathode of said first diode circuit and jointly responsive to said reference potential and said color-synchronizing component translated through said network for developing on the anode of said other diode a resultant signal representative of any deviation of said peak amplitudes of said translated synchronizing components from said predetermined ratio; and means for utilizing said resultant signal to modify the relative amplitudes of said luminance and chrominance components translated through said network, thereby to effect automatic color-saturation control.

14. In a color-television receiver, a color-saturation control apparatus comprising: a circuit for supplying the luminance, chrominance, deflection-synchronizing, and color-synchronizing components of an NTSC color-television signal in which the peak amplitudes of said synchronizing components desirably have a predetermined ratio; a signal-translating network for translating said chrominance and color-synchronizing components as one group and said luminance and deflection-synchronizing components as another group of signals in which the relative amplification of said groups of signals can be varied; a first detector circuit coupled to said network; means for periodically applying a gating signal to said first detector for causing said first detector to become conductive and to respond to said deflection-synchronizing component translated through said network to clamp the peak of said translated deflection-synchronizing component to a reference potential; another detector circuit coupled to said network and to said first detector circuit and jointly responsive to said reference potential and said color-synchronizing component translated through said network for developing a resultant signal representative of any deviation of said peak amplitudes of said translated synchronizing components from said predetermined ratio; and means for utilizing said resultant signal to modify the relative amplitudes of said luminance and chrominance components translated through said network, thereby to effect automatic color-saturation control.

15. In a color-television receiver, a color-saturation control apparatus comprising: a circuit for supplying the luminance, chrominance, deflection-synchronizing, and color-synchronizing components of an NTSC color-television signal in which the peak amplitudes of said synchronizing components desirably have a predetermined ratio; a signal-translating network for translating said chrominance and color-synchronizing components as one group and said luminance and deflection-synchronizing components as another group of signals in which the relative amplification of said groups of signals can be varied; a first detector circuit coupled to said network and responsive to said deflection-synchronizing component translated through said network to clamp the peak of said translated deflection-synchronizing component to a reference potential; means for applying a gating signal to said first detector during the time of occurrence of said color-synchronizing component to cause said first detector to become nonconductive during said time; another detector circuit coupled to said network and to said first detector circuit and jointly responsive to said reference potential and said color-synchronizing component translated through said network for developing a resultant signal representative of any deviation of said peak amplitudes of said translated synchronizing components from said predetermined ratio; and means for utilizing said resultant signal to modify the relative amplitudes of said luminance and chrominance components translated through said network, thereby to effect automatic color-saturation control.

16. In a color-television receiver, a color-saturation control apparatus comprising: a circuit for supplying the luminance, chrominance, deflection-synchronizing, and color-synchronizing components of an NTSC color-television signal in which the peak amplitudes of said synchronizing components desirably have a predetermined ratio; a signal-translating network for translating said chrominance and color-synchronizing components as one group and said luminance and deflection-synchronizing components as another group of signals in which the relative amplification of said groups of signals can be varied; a signal-comparison circuit including an electron-discharge device having anode, control-electrode, and cathode circuits, said control-electrode and cathode circuits being coupled to said network and responsive to said deflection-synchronizing and color-synchronizing components translated therethrough for comparing the peak amplitudes of said translated synchronizing components to develop in said anode circuit a resultant signal representative of any deviation of said peak amplitudes of said translated synchronizing components from said predetermined ratio; and means coupled to said anode circuit for utilizing said resultant signal to modify the relative amplitudes of said luminance and chrominance components translated through said network, thereby to effect automatic color-saturation control.

17. In a color-television receiver, a color-saturation control apparatus comprising: a circuit for supplying the luminance, chrominance, deflection-synchronizing, and color-synchronizing components of an NTSC color-television signal in which the peak amplitudes of said synchronizing components desirably have a predetermined ratio; a signal-translating network for translating said chrominance and color-synchronizing components as one group and said luminance and deflection-synchronizing components as another group of signals in which the relative amplification of said groups of signals can be varied; a signal-comparison circuit including an electron-discharge device having anode, control-electrode, and cathode circuits, said control-electrode and cathode circuits being coupled to said network and responsive to said deflection-synchronizing component translated therethrough for clamping the peak of said translated deflection-synchronizing component to a predetermined reference level; means coupled to said anode circuit for causing anode-cathode current to flow in said device at the time said color-synchronizing component translated through said network is applied to said cathode circuit for comparing the peak potential of said translated color-synchronizing component to said reference level to develop in said anode circuit a resultant signal representative of any deviation of said peak amplitudes of said translated synchronizing components from said predetermined ratio; and means for utilizing said resultant signal to modify the relative amplitudes of said luminance and chrominance components translated through said network, thereby to effect automatic color-saturation control.

18. In a color-television receiver, a color-saturation control apparatus comprising: a circuit for supplying the luminance, chrominance, deflection-synchronizing, and color-synchronizing components of an NTSC color-television signal; a signal-translating network for translating said chrominance and color-synchronizing components and said luminance and deflection-synchronizing components and including an adjustable color-saturation control for manually controlling the relative gains of said network to said translated chrominance and color-synchronizing components with respect to said luminance and deflection-synchronizing components; a signal-comparison circuit coupled to said network and responsive to said deflection-synchronizing and color-synchronizing components translated therethrough for comparing the peak amplitudes of said translated synchronizing components to develop a resultant signal representative of any deviation of said peak amplitudes of said translated synchronizing components from a predetermined ratio; and means for utilizing said resultant signal to modify the relative amplitudes of said luminance and chrominance components and the relative amplitudes of said deflection-synchronizing and color-synchronizing components translated through said network to maintain said predetermined ratio at said comparison circuit regardless of the setting of said adjustable color-saturation control, thereby to effect automatic color-saturation control.

19. In a color-television receiver, a color-saturation control apparatus comprising: a circuit for supplying the luminance, chrominance, deflection-synchronizing, and color-synchronizing components of an NTSC color-television signal; a signal-translating network including one channel for translating said chrominance and color-synchronizing components as one group, including another channel for translating said luminance and deflection-synchronizing components as another group of signals, and including an adjustable color-saturation control coupled between said channels for controlling the relative gains thereof; a signal-comparison circuit coupled to said network and responsive to said deflection-synchronizing and color-synchronizing components translated therethrough for comparing the peak amplitudes of said translated synchronizing components to develop a resultant signal representative of any deviation of said peak amplitudes of said translated synchronizing components from a predetermined ratio; and means for utilizing said resultant signal to modify the relative amplitudes of said luminance and chrominance components and the relative amplitudes of said deflection-synchronizing and color-synchronizing components translated through said network to maintain said predetermined ratio at said comparison circuit regardless of the setting of said adjustable color-saturation control, thereby to effect automatic color-saturation control.

References Cited in the file of this patent

UNITED STATES PATENTS

| | | |
|---|---|---|
| 2,644,030 | Moore | June 30, 1953 |
| 2,680,147 | Rhodes | June 1, 1954 |
| 2,743,310 | Schroeder | Apr. 10, 1956 |
| 2,745,900 | Parker | May 15, 1956 |
| 2,754,356 | Espenlaub | July 10, 1956 |

OTHER REFERENCES

Two-Color, Direct-View Receiver, RCA, November 1949, pages 16–17.

Color TV, Rider Pub., March 1954, pages 141, 142.

Introduction to Color Television, Admiral Corp., Chicago, Ill., February 1954, pages 7 to 17.